United States Patent
Uhlig et al.

(10) Patent No.: US 9,888,104 B2
(45) Date of Patent: Feb. 6, 2018

(54) DOCKING STATION FOR A MOBILE ELECTRONIC DEVICE FOR USE IN A VEHICLE INTERIOR

(71) Applicant: Faurecia Innenraum Systeme GmbH, Hagenbach (DE)

(72) Inventors: Markus Uhlig, Stuttgart (DE); Omar Ben Abdelaziz, Beauvais (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 15/247,391

(22) Filed: Aug. 25, 2016

(65) Prior Publication Data
US 2017/0064056 A1    Mar. 2, 2017

(30) Foreign Application Priority Data
Aug. 27, 2015  (DE) .......... 10 2015 216 424

(51) Int. Cl.
| | |
|---|---|
| H04M 1/00 | (2006.01) |
| H04B 1/38 | (2015.01) |
| H04M 1/04 | (2006.01) |
| H04M 1/725 | (2006.01) |
| B60R 11/02 | (2006.01) |
| B60R 11/00 | (2006.01) |

(52) U.S. Cl.
CPC .............. *H04M 1/04* (2013.01); *B60R 11/02* (2013.01); *H04M 1/7253* (2013.01); *H04M 1/72527* (2013.01); *B60R 2011/0075* (2013.01)

(58) Field of Classification Search
CPC ....................................... H04M 1/04
USPC .................... 455/556.1, 557, 404.2
See application file for complete search history.

(56) References Cited

U.S. PATENT DOCUMENTS

| | | | | |
|---|---|---|---|---|
| 6,405,049 B2* | 6/2002 | Herrod | ............... | G06F 1/1626 455/426.1 |
| 7,330,737 B2* | 2/2008 | Mahini | ............... | G06F 1/1632 455/41.3 |
| 7,515,914 B2* | 4/2009 | Herrod | ............... | G06F 1/1626 455/404.2 |

(Continued)

FOREIGN PATENT DOCUMENTS

| | | |
|---|---|---|
| DE | 102011105874 A1 | 12/2012 |
| WO | WO2007011425 A1 | 1/2007 |

OTHER PUBLICATIONS

Chameleon Clock App für iOS Systeme lässt Geräte-Displays durchsichtig erscheinen, "TN TechnikNeuheiten.com". S. 1. , accessed Jun. 8, 2016 at http://www.technikneuheiten.com/chameleon-clock-app-fur-ios-systeme-lasst-gerate-displays-durchsichtig-erscheinen/, Jul. 30, 2012, 1 page.

(Continued)

*Primary Examiner* — Tilahun B Gesesse
(74) *Attorney, Agent, or Firm* — Reising Ethington P.C.

(57) ABSTRACT

A docking station for a mobile electronic device for use in a vehicle interior. The docking station includes a receiver for the mobile electronic device, a position sensor, a data processing unit and a screen. The receiver is configured for inserting the mobile electronic device, and the position sensor is configured to detect positions of the mobile electronic device relative to the receiver. The data processing unit is connected to the position sensor and is configured to output pictures on the screen in a manner depending on the positions.

12 Claims, 4 Drawing Sheets

(56) References Cited

U.S. PATENT DOCUMENTS

| | | | |
|---|---|---|---|
| 8,527,688 B2* | 9/2013 | Chatterjee | G06F 1/1632 336/221 |
| 8,712,324 B2* | 4/2014 | Corbridge | G06F 1/1632 455/41.1 |
| 2001/0055978 A1* | 12/2001 | Herrod | G06F 1/1626 455/517 |
| 2002/0032042 A1* | 3/2002 | Poplawsky | B60R 11/0241 455/564 |
| 2003/0074119 A1* | 4/2003 | Arlinsky | B60K 35/00 701/36 |
| 2003/0181168 A1* | 9/2003 | Herrod | G06F 1/1626 455/90.3 |
| 2008/0026794 A1 | 1/2008 | Warren | |
| 2010/0081473 A1* | 4/2010 | Chatterjee | G06F 1/1632 455/559 |
| 2015/0066511 A1 | 3/2015 | Baek | |

OTHER PUBLICATIONS

German Search Report in German not translated for DE application No. 102015216424.1, dated Jun. 8, 2016, 9 pages.

* cited by examiner

DOCKING STATION FOR A MOBILE ELECTRONIC DEVICE FOR USE IN A VEHICLE INTERIOR

TECHNICAL FIELD

The invention relates to a docking station for a mobile electronic device for use in a vehicle interior.

BACKGROUND

Devices for use in a vehicle interior are known from the state of the art, wherein these are configured to hold a mobile telephone such that a driver or another vehicle occupant can see the mobile telephone and also reach it and operate it when required. Such devices are usually configured for fastening to an inner side of a front windscreen of a vehicle by way of suction cups, which can lead to a restriction of the field of view of the driver of the vehicle. A distance between the driver and a screen of the mobile telephone held by the device is moreover typically so large that the driver has difficulty in acquiring the information represented on the screen and that operating elements of the mobile telephone are very difficult to reach. The attention of the driver may be distracted from the road traffic for a relatively long period of time during a journey due to this situation. Moreover, it can occur that the fastening of the device on the front windscreen does not hold in a reliable manner, in particular after an ageing of the suction cups.

SUMMARY

It is an object of the present invention to provide a docking station which is suitable for receiving a mobile electronic device in a vehicle interior, is user-friendly and at the same time overcomes the disadvantages of known device which are mentioned above.

This object is achieved by a docking station with the features of the main claim. Advantageous further developments are represented by the features of the dependent claims and of the embodiment examples.

The suggested docking station for a mobile electronic device for use in a vehicle interior comprises a receiver for the mobile electronic device, a position sensor, a data processing unit and a screen. The receiver is configured for the insertion of the mobile electronic device, and the position sensor is configured to detect positions of the mobile electronic device relative to the receiver. The data processing device is moreover connected to the position sensor and is configured to output pictures to the screen in a manner depending on the positions.

The mobile electronic device for example can be a mobile telephone, in particular a smartphone, a tablet computer or a portable media playing device. The described docking station can thus in particular be a docking station for a smartphone or a tablet computer or a portable media playing device.

Information regarding a position of the mobile electronic device is available to the data processing unit due to the fact that the docking station comprises a position sensor connected to the data processing unit. The data processing unit for example can detect whether the mobile electronic device is completely inserted in the receiver or only partly in the receiver or whether no such device is located in the receiver.

It is possible to optically signal to a vehicle occupant how far the mobile electronic device is inserted into the receiver, due to the fact that the data processing unit is configured to output pictures onto the screen in a manner depending on the detected positions. Such a display can contribute to the vehicle occupant not becoming edgy or impatient, for example during the insertion or a removal of the smartphone into and out of the receiver of the docking station respectively. A representation which is perceived as aesthetically pleasing by the vehicle occupant can moreover also be achieved by the use of suitable pictures.

For the optical signaling, the pictures can for example be designed in a manner such that an animation results when inserting or removing the mobile electrical device. For this, the docking station can have a data memory which is connected to the data processing unit and on which pictures are stored, said pictures being assigned to the positions by way of the data processing unit. In this manner, one can for example envisage an animation on the screen showing how a schematic representation of a smartphone moves from an edge of the screen into a middle of the screen during the insertion of the smartphone into the receiver. Further effects can be also provided alternatively or additionally to this, such as for example a representation of a temporally changing color gradient on the screen, wherein a position or an interval of positions of the smartphone relative to the receiver corresponds to each color hue of the color gradient.

The screen is typically arranged in a middle console or in an instrument panel of the vehicle in a manner such that this screen can be clearly seen by the driver of the vehicle. The screen can moreover be designed sufficiently large, so that the driver can easily recognize the pictures represented on the screen.

The screen can be arranged in the vehicle interior in a manner such that the pictures represented on this screen can be represented in the proximity of other information which is displaced by the vehicle and which for example can concern the control of the air conditioning or other functions. The driver can quickly acquire different information in this manner, which contributes to an increased safety, since the attention of the driver needs to be distracted from the road traffic for shorter time intervals for acquiring this information.

The docking station moreover typically has operating elements which are connected to the data processing unit and permit a control of the mobile electronic device. For this purpose, the docking station typically comprises an interface for a transmission of data between the mobile electronic device and the data processing unit. Such an interface for example can be designed as a wireless interface or as a cable connection by way of a plug.

Moreover, there also exists the possibility of displaying an operating surface on the screen for the control of the mobile electric device. The displayed operating surface, given an adequate size of the screen, can be larger than an operating surface which is displayed on the screen of the mobile electronic device and is for the control of the mobile electronic device. An operation of the mobile electronic device which is more comfortable compared to conventional devices can be achieved by way of this. For example, one can envisage a vehicle occupant accessing application software located on his smartphone via the docking station in this manner, in order for instance to use navigation software or media data banks which are located on the smartphone.

The docking station typically comprises a data transmission device which is connected to the data processing unit, wherein the data processing unit is configured to receive a screen content of the mobile electronic device via the data transmission device in the form of data. The outputted pictures in this case can correspond to the screen content or a part of the screen content, specifically at least with regard to content, but preferably—with the exception of a possibly envisaged scaling—also with regard to the manner of representation.

For example, one can envisage the screen reproducing an animation during the insertion of a smartphone into the receiver, with which animation the screen content of the smartphone moves from the edge of the screen to the middle of the screen. The data transmission device can also correspond to the interface mentioned above.

The screen content of the mobile electronic device can be seen as abstract screen content, so that this does not necessarily correspond to a picture displayed on the mobile electronic device at every moment. For example, one can envisage the mobile electronic device not showing any screen content whilst the mobile electronic device is inserted into the receiver and/or when the mobile electronic device is completely inserted into the receiver, due to the screen of the mobile electronic device switching off, for example in order to save energy.

If the outputted pictures correspond to the screen content or to a part of the screen content, then a vehicle occupant can fall back on an operating surface with which he is familiar if he uses his own mobile electronic device with the docking station. The screen content of the mobile electronic device is typically displayed on the screen of the docking station in an enlarged manner, so that this can be easily recognized by the vehicle occupant. The use of an individualized operating surface can be particularly advantageous with the use of the docking station in a rental vehicle, since a vehicle occupant of the rental vehicle is often not familiar with operating elements provided in the rental vehicle.

In an embodiment, the docking station comprises a cover of the receiver which at least partly covers the mobile electronic device when it is completely inserted into the receiver. The mobile electronic device, when it is completely inserted into the receiver, is at least partly hidden from the vehicle occupant by way of this. The cover for example can be formed by a part of the vehicle inner trim and/or by the screen of the docking station.

In this case, the outputted pictures in this case can correspond to a part of the screen content which is covered by the cover. An aesthetically pleasant effect, with which the vehicle occupant is given the impression that he perceives the screen content of the mobile electronic device through the screen, can be achieved by way of this during the insertion or removal of the mobile electronic device.

The docking station can comprise a guide element which is configured to guide the mobile electronic device into the receiver. This makes it possible that the mobile electronic device comes to lie in the same position in the receiver over repeated insertion procedures without precise manual positioning.

The guide element can comprise two springs which are arranged on opposite inner sides of the receiver and are configured to guide the mobile electronic device into the receiver. The springs can be additionally configured to hold a mobile electronic device inserted into the receiver in position in this receiver.

In a possible embodiment, the guide element comprises a holder for the mobile electronic device, said holder being extendible and retractable relative to the receiver. One can for example envisage this holder being guided on a rail. For example, the vehicle occupant, after the holder has been extended (moved out), can place a mobile electronic device on the holder, whereupon the holder is retracted (moved in), so that the electronic device is guided into the receiver. The holder for example can comprise an electrical servo motor for an automatic retraction and extension.

The position sensor can comprise a sensor which is movable relative to the receiver and which is movable by way of a displacement of the mobile electronic device relative to the receiver. Here, the sensor is connected to a potentiometer such that an electrical resistance of the potentiometer is changeable by way of displacing the mobile electronic device relative to the receiver.

Thus, a position of the sensor can be detected for the data processing unit via a change of the electrical resistance of the potentiometer. A position of the mobile electronic device relative to the receiver can be electronically detected by the data processing unit in this manner, due to the fact that the sensor in turn is moveable by way of a displacement of the mobile electronic device relative to the receiver.

The sensor can be designed as a purely translationally-displaceable component or also be designed as a lever mounted at one side. The potentiometer can be designed for example as a rotary potentiometer or slider potentiometer. A rotary potentiometer is particularly suitable if the sensor is designed as a lever mounted at one side. A slider potentiometer in contrast is suitable if the sensor is designed in a purely translationally-displaceable manner.

A return spring can be additionally provided in order to ensure that the sensor is in contact with the mobile electronic device on inserting as well as on removing the mobile electronic device into and out of the receiver respectively, and in particular that it reliably moves back into an initial position also when removing the mobile electronic device out of the receiver.

The position sensor can also comprise an optical sensor and/or a Hall effect sensor and/or a coder. If a coder is provided, it is then configured for a detection of positions of the mobile electronic device relative to the receiver and for outputting the respective position to the data processing unit as an electrical signal.

A docking station which, as a position sensor or instead of a position sensor or additionally to the position sensor, comprises a camera connected to the data processing unit and configured to acquire (detect) the picture content of the mobile electronic device or the part of the picture content of the mobile electronic device which is covered by a possibly present cover when the mobile electronic device is at least partly located in the receiver of the docking station, can also additionally be provided. The camera in this case can be configured to output the screen content or the part of the screen content which is detected by it to the data processing unit, wherein the data processing unit is configured to output the screen content or part of the screen content detected by the camera to the screen so that the screen content or the covered part of the screen content can be displayed on the screen. If the camera is configured for a repeated detection of the screen content or of the covered part of the screen content, then the docking station can display a respective current screen content or covered part of the screen connect of the mobile electronic device on the screen. Similarly to what has been described above, this makes it possible that during the insertion of the smartphone into the receiver the screen displays an animation in which the screen content of the smartphone moves from the edge of the screen to the screen middle.

In a typical embodiment, the screen is designed as a touchscreen, wherein the docking station is configured to receive inputs for the mobile electronic device via the touchscreen and to transfer them to the mobile electronic device. The docking station for example can have an interface for data transmission between the data processing unit and the mobile electronic device, so that the touchscreen can be used by the vehicle occupant for accessing applications of the mobile electronic device. For example, one can envisage the docking station being configured to display the screen content of a smartphone on the screen and for the touchscreen to be able to be used as a user interface for the control of software of the smartphone. Here, one typically envisages an actuation of the touchscreen at a location at which a certain point of the screen content is imaged activating the same computation steps of the smartphone which a direct activation of the touchscreen of the smartphone at a location corresponding to the certain point of the screen content would activate. The fact that the screen is designed as a touchscreen can also be advantageous for a docking station in which not all of the features described above are present. For example, the user-friendly activation of the smartphone which is described here can also be achieved by a docking station for a mobile electronic device for use in a vehicle interior, wherein the docking station comprises a receiver for the mobile electronic device which is configured for the insertion of the mobile electronic device, and a data processing unit and a screen designed as a touchscreen. The docking station moreover comprises a data transmission device connected to the data processing unit, wherein the data processing unit is configured to receive a screen content of the mobile electronic device via the data transmission device, in the form of data, and to output this screen content onto the screen. The docking station is moreover configured to receive inputs for the mobile electronic device via the touchscreen and to transfer it to the mobile electronic device.

It is also possible for other types of operating elements to be provided on the docking station instead of the touchscreen or additionally to the touchscreen, such as push buttons or rotary buttons, which serve as input means for controlling the mobile electronic device and whose inputs are transferred by the data processing unit to the mobile electronic device.

The position sensor can further comprise a microswitch which is configured to switch when the mobile electronic device is completely inserted into the receiver. The microswitch is typically connected to the data processing unit. The data processing unit for example can activate a release of the activating ability of the touchscreen as a result of switching the microswitch, since in this case an assignment of the locations on the touchscreen to the locations on a touchscreen of the mobile electronic device can be carried out in a simple manner by the data processing unit.

The data transmission device is typically configured for wirelessly receiving the screen content of the mobile electronic device. A receipt of the screen content can be provided for example by way of Near Field Communication and/or Bluetooth. Wireless data transmission technologies for data transmission between the data processing unit and the mobile electronic device have the advantage that these can typically be adapted to different types of smartphone without any mechanical difficulties, whereas a connection by way of a plug connector requires an adaptation to different positions provided for a plug connection in different smartphone types.

BRIEF DESCRIPTION OF THE DRAWINGS

Embodiment examples of the invention are hereafter described by way of drawings. There are shown in.

DETAILED DESCRIPTION OF THE ILLUSTRATED EMBODIMENTS

Figure 1:
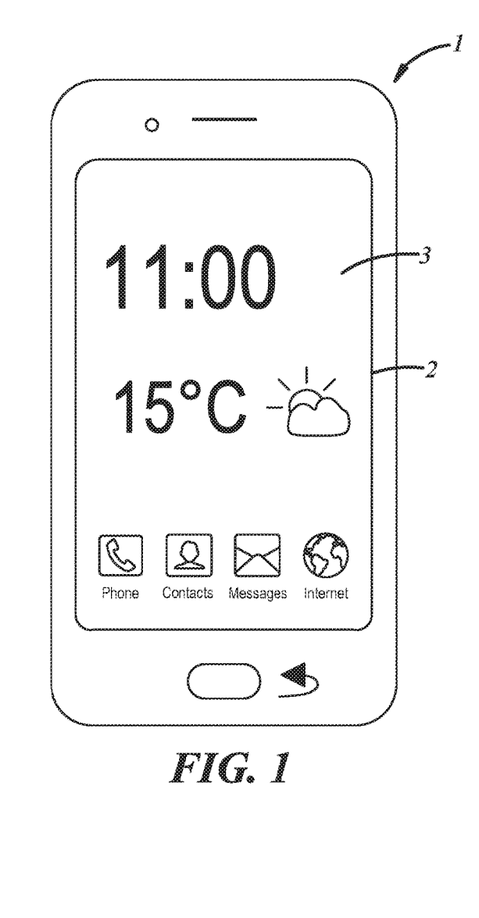
FIG. 1—a schematic view of a smartphone.

FIG. 1 shows a mobile electronic device 1 in the form of a smartphone with a smartphone screen 2 displaying the content 3 of a screen. The smartphone screen 2 is designed as a touchscreen serving as an input interface for a user, so that he can control application software on the smartphone with the help of the touchscreen.

Figure 2:
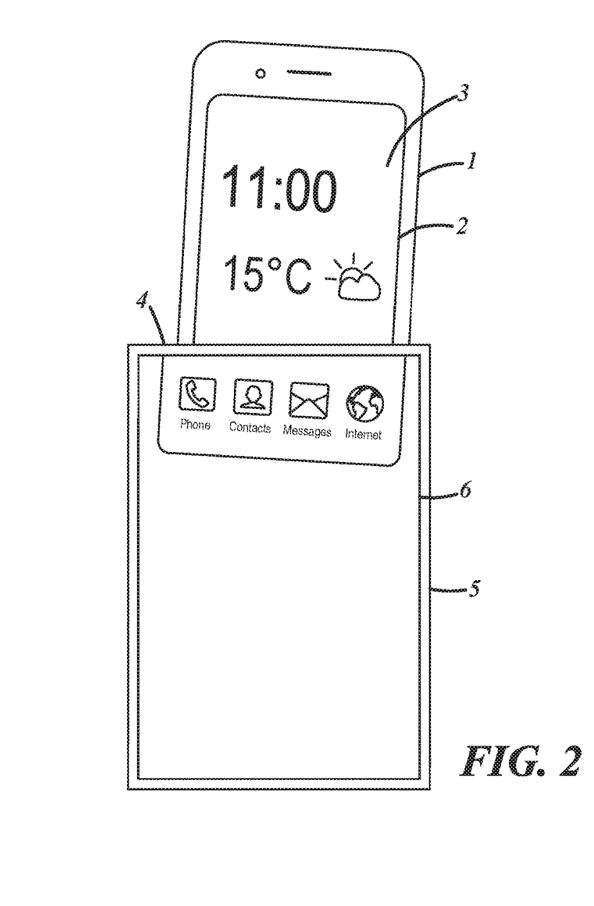
FIG. 2—a schematic view of the smartphone and a docking station for the smartphone, FIG. 3—a similar view of the smartphone and the docking station in another state, FIG. 4—a further view of this docking station in a state in which the smartphone is completely inserted into the docking station, FIG. 5—the inside of the docking station in one of several possible embodiments together with the smartphone, which is partly inserted into the docking station, FIG. 6—a representation of the docking station which corresponds to FIG. 5, with the smartphone completely inserted into the docking station, FIG. 7—a schematic representation of a vehicle interior with a docking station for the smartphone in another embodiment, FIG. 8—a representation of the vehicle interior corresponding to FIG. 7, with this docking station and a smartphone, FIG. 9—a corresponding representation of the vehicle interior with the docking station in a state in which the smartphone is partly inserted into the docking station, and FIG. 10—a corresponding representation of the vehicle interior with the docking station in a state in which the smartphone is completely inserted into the docking station.

The smartphone together with a docking station 5 for the smartphone is represented in FIG. 2, wherein the docking station 5 is built into an interior of a vehicle which is not represented here. Recurring and similar features in this and in the subsequent representations are provided with the same reference numerals. The docking station 5 and the smartphone here are represented in a state in which the smartphone is partly inserted into a receiver 4 of the docking station 5, so that a part of the screen content 3 of the smartphone is covered by a part of the docking station 5. The complete screen content 3 of the smartphone is therefore not directly visible to a vehicle occupant in the state shown. The docking station 5 for example is installed or recessed into a vehicle interior trim of an instrument panel or a middle console of a car or automobile. The docking station 5 includes the receiver 4 which is configured for receiving the smartphone from above, and also comprises a screen 6 and a charging device which is not represented and is for charging a battery of a smartphone.

The docking station 5 moreover comprises a data processing unit (not shown) and a position sensor which is likewise not shown here for detecting positions of the smartphone relative to the receiver 4. Here, the position sensor is configured to detect how deeply the smartphone is inserted into the receiver 4. For this, the position sensor can comprise for example an optical sensor or a Hall sensor or a mechanical sensor. A coder can moreover be provided which delivers to the data processing unit an electrical signal corresponding to the detected position of the smartphone.

The docking station 5 moreover comprises a data transmission device (not shown) which is connected to the data processing unit and is configured for a wireless transmission of data from the smartphone to the data processing unit and from the data processing unit to the smartphone. For this, the docking station 5 and the smartphone can be configured for example for communication by way of near field communication. Software which is specially configured for the purpose of a data exchange with the docking station 5 runs on the smartphone. The docking station 5 and the smartphone are configured in a manner such that the smartphone can transfer the screen content 3 of the smartphone in a wireless manner via the data transmission device to the data processing unit of the docking station 5.

The data processing unit is configured to output pictures to the screen 6 of the docking station 5, said pictures being able to be displayed on this screen. The data processing unit assigns a part of the screen content 3 received from the smartphone to a position which is currently determined by the position sensor, for computing the pictures to be outputted onto the screen 6. Here, the data processing unit determines a part of the screen content 3 of the smartphone which is covered by the screen 6 of the docking station 5 on the basis of the current position of the smartphone. The pictures which are subsequently outputted onto the screen 6 then correspond to the part of the screen content 3, this part being displayed at the position of the screen 6 which is located above the covered screen content 3. In the example shown, the covered part of the screen content 3 of the smartphone is displayed on the screen 6 of the docking station 5 in an enlarged manner.

The docking station 5 can also comprise a camera, not represented here, which is connected to the data processing unit and is configured to detect (acquire) the screen content 3 or the part of the screen content 3 which is displayed on the part of the smartphone which is pushed into the docking station 5, and to output the detected screen content 3 or the mentioned part of the screen content 3 to the data processing unit for display on the screen 6.

Figure 3:
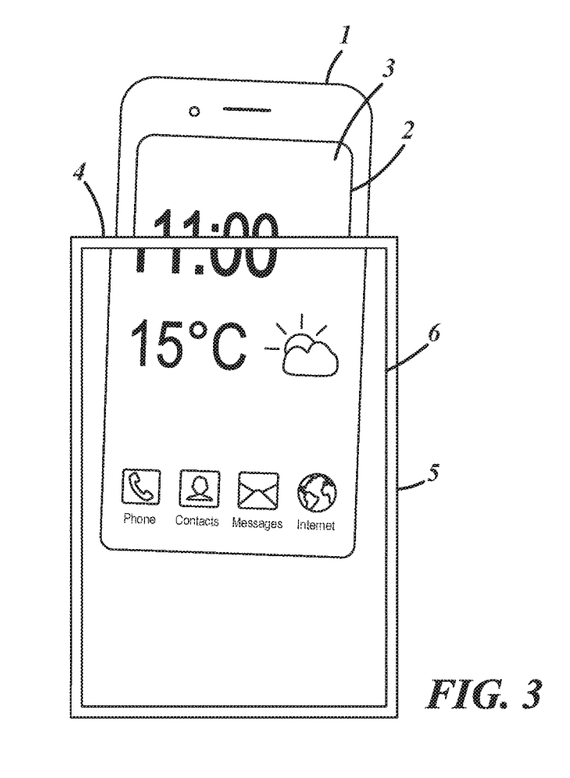

FIG. 3 shows the docking station 5 and the smartphone in a state in which the smartphone is inserted into the receiver 4 of the docking station 5 more deeply compared to the state shown in FIG. 2. The position sensor now detects a different position of the smartphone and transmits this to the data processing unit. The data processing unit determines afresh the part of the screen content 3 of the smartphone which is covered by the screen 6 of the docking station 5, and outputs a picture onto the screen 6 of the docking station 5, said picture corresponding to the covered part of the screen content 3 of the smartphone, wherein this part of the screen content 3 is displayed at a position of the screen 6 which lies over the covered part of the screen content 3.

The position of the smartphone is detected by the position sensor with such a high resolution that an almost continuous succession of pictures results on inserting the smartphone into the receiver 4 in the described manner, wherein this sequence shows how the screen content 3 of the smartphone moves to the screen middle of the screen 6 of the docking station 5. Conversely, a similar sequence of pictures shows how the screen content 3 of the smartphone moves out of the screen 6 of the docking station 5, on removal of the smartphone out of the receiver 4.

Figure 4:
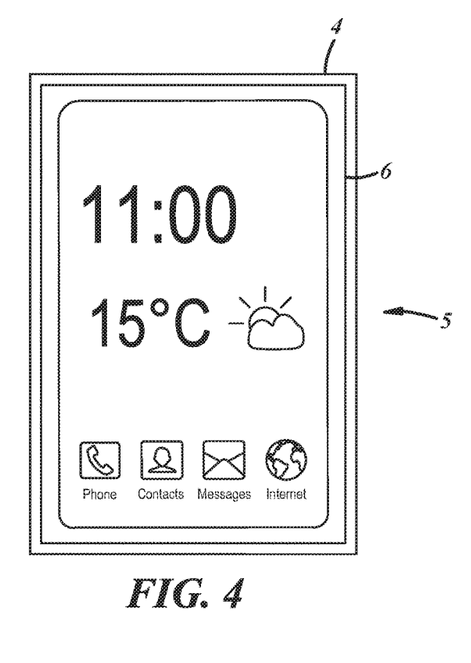

A state in which the smartphone is inserted completely into the receiver 4 of the docking station 5 and is completely covered by the screen 6 of the docking station 5 is represented in FIG. 4. The pictures which are outputted by the data processing unit onto the screen 6 correspond to the complete screen content 3 of the smartphone in this arrangement. This screen content 3 is displayed on the screen 6 in an enlarged manner and can be easily recognized by the vehicle occupant in this manner.

The screen 6 of the docking station 5 is designed as a touchscreen. The data processing unit releases an activation of the touchscreen as soon at the smartphone is completely introduced into the receiver 4. If the vehicle occupant actuates the touchscreen by way of contacting at a certain location of the touchscreen, then the data processing unit determines the location of the actuation relative to the displayed screen content 3. This information is transmitted via the data transmission device to the smartphone, whose software, in a manner depending on this information, carries out computation steps or activates functions which are normally carried out or activated when the smartphone is touched itself at the corresponding location of its screen content. The smartphone can be controlled by the vehicle occupant in this manner, by way of activating the screen 6 of the docking station 5, which is designed as a touchscreen.

Figure 5:
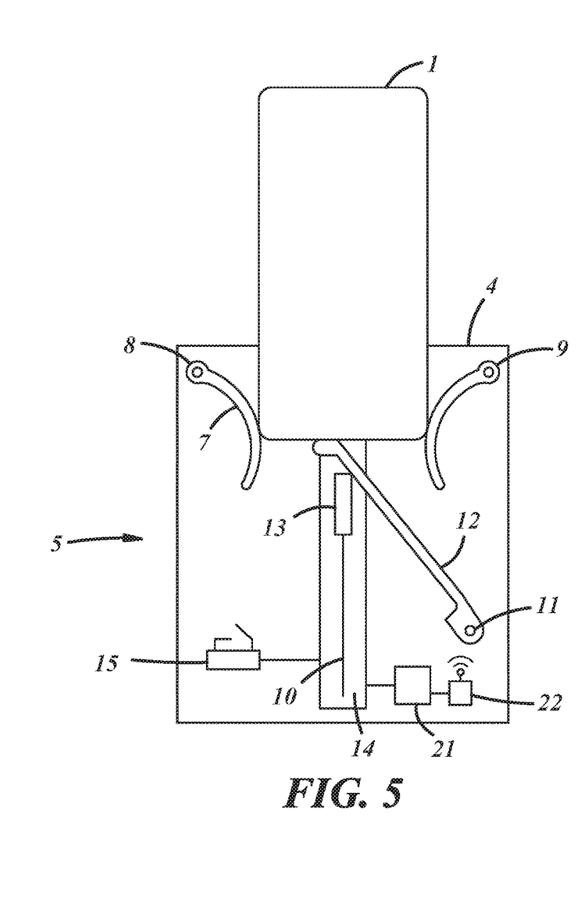

The inside of the docking station 5 which lies below the screen 6 omitted here and which is with the partly inserted mobile electronic device 1 and is with one possible embodiment of the position sensor 10 is represented in FIG. 5. FIG. 5 shows an interior of a docking station 5 below the screen 6 (omitted here) with one possible embodiment of the position sensor 10, together with the partially inserted mobile electronic device 1. Here, one can recognize a guide element 7 of the docking station 5 which comprises two springs 8, 9. These springs 8, 9, arranged on two opposite inner sides of the receiver 4, are designed such that they guide the smartphone at two opposite sides of the smartphone when the smartphone is inserted into the receiver 4. Herein, the smartphone is held centrally in the receiver by way of the springs 8, 9.

The data processing unit 21, which is described above, the data transmission device 22, which is likewise described above, as well as details of the position sensor 10 are also recognizable in FIG. 5. In this embodiment, the position sensor 10 comprises a sensor 12 which is designed as a lever which is rotatably mounted about a pivot or axis 11. The smartphone comes into contact with the sensor 12 and presses this downwards when the smartphone is inserted downwards into the receiver 4. The sensor 12 herein presses upon a finger 13 which is connected to a potentiometer 14 designed as a slider potentiometer, in a manner such that an electrical resistance of the potentiometer 14 changes due to a displacement of the finger 13. The data processing unit 21 is connected to the potentiometer 14 and determines the current electrical resistance of the potentiometer 14. The data processing unit 21 determines a respective current position of the smartphone relative to the receiver 4, by way of the electrical resistance of the potentiometer 14. In another embodiment, the potentiometer 14 can also be designed as a rotary potentiometer which is connected to the lever in the region of the pivot 11.

Figure 6:
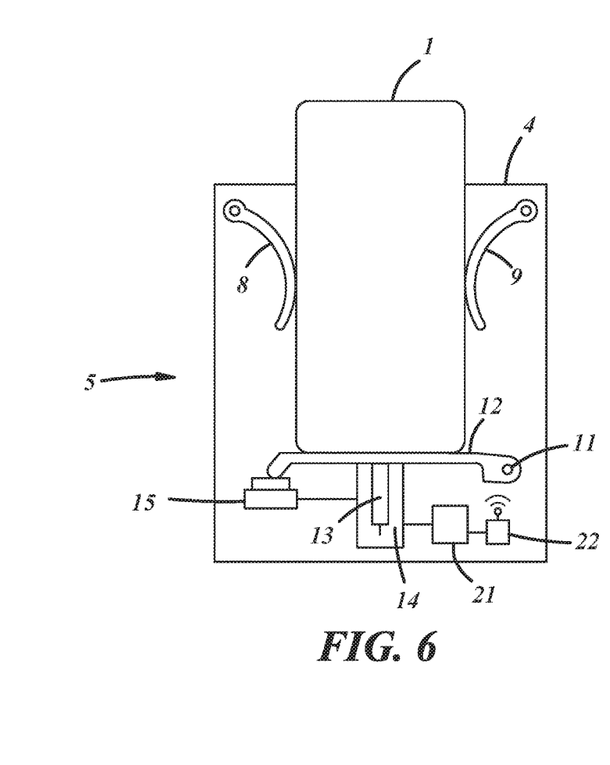

The position sensor moreover comprises a microswitch 15. This microswitch is arranged such that the lever actuates the microswitch 15 when the smartphone is inserted into the receiver 4 in a complete manner. If the smartphone is inserted into the receiver 4, then the lever presses onto the finger 13, so that this simultaneously moves downwards with the smartphone, until the fingers 13 hits an abutment 16 and comes to a standstill together with the smartphone. This state is represented in FIG. 6. The lever is completely thrown over in this state and with one end presses upon the microswitch 15 such that this switches. The microswitch 15 is connected to the data processing unit 21 and in this manner delivers a signal to the data processing unit 21 when the smartphone is completely located in the receiver 4. One can envisage the data processing unit 21 releasing the screen 6 of the docking station 5, which is designed as a touch screen, as a result of this signal for operating the smartphone via the touchscreen.

If the smartphone is pulled out of the receiver 4, then a return spring which is connected to the finger 13 ensures that the finger 13 presses upon the lever during the removal of the smartphone, such that this lever remains in contact with the smartphone, until the lever as well as the finger 13 again assume their initial positions represented in FIG. 5. If the finger 13 is connected to the lever, it is also possible for a torsion spring connected to the lever in the region of the pivot 11 to ensure that the lever remains in contact with the smartphone when pulling out the smartphone until the lever comes to lie in its initial position, wherein the lever then also pulls the finger 13 into its initial position. One succeeds in the current position of the smartphone also being detected during the removal in this manner.

Figure 7:
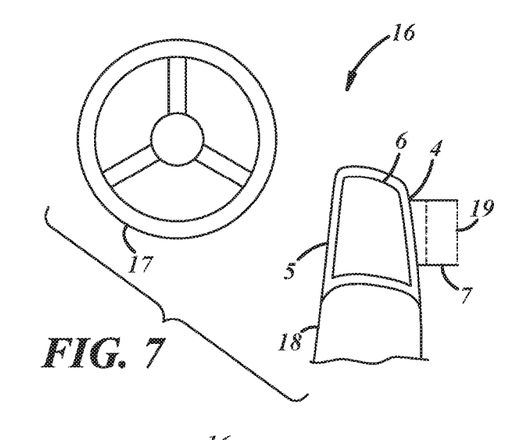

FIG. 7 shows a schematically represented vehicle interior 16 with a docking station 5 according to another embodiment example. A steering wheel 17 and a middle console 18 can be seen in the vehicle interior 16. The docking station 5 is incorporated into the middle console 18. The docking station 5 comprises a screen 6 and a receiver 4 for receiving a mobile electronic device 1, which also in this case is a smartphone, as well as a guide element 7 with a holder 19 which can be extended and retracted laterally relative to the receiver and which is for holding the smartphone. The holder 19 is in an extended state in the shown arrangement.

Figure 8:
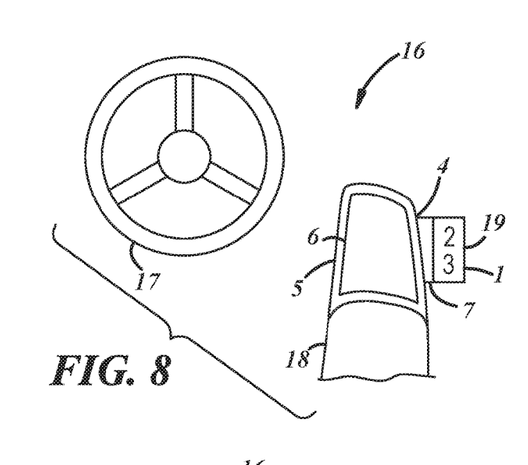

The docking station 5 of FIG. 7 together with the mobile electronic device 1, which here is shown in the holder 19, is represented in FIG. 8. If the smartphone, as shown here, is inserted into the holder 19, then it can be retracted together with the holder 19 into the receiver 4 with the help of an electrical servo motor. This docking station 5 also comprises a position sensor, which is not shown here and which is configured to detect the current position of the holder 19 and of the smartphone located therein, and to output it to a data processing unit of the docking station 5, which is likewise not shown here. The docking station 5 moreover comprises a flash memory, which is connected to the data processing unit and is likewise not shown and on which pictures are stored. The data processing unit is configured to output one of those pictures in each case to the screen 6, in a manner depending on the detected positions of the smartphone and the holder 19.

Figure 9:
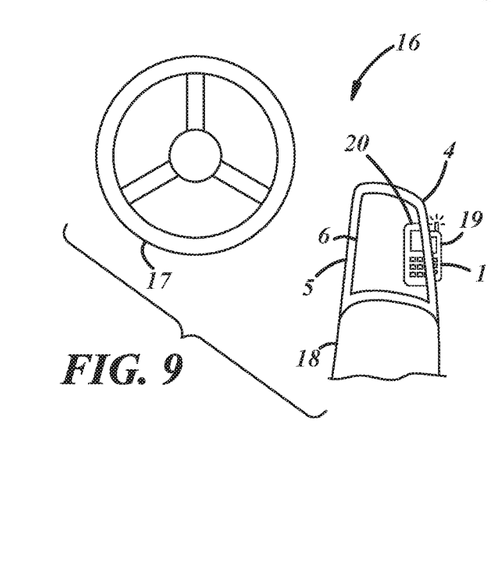

As is represented in FIG. 9, given a position of the holder 19 which is partly retracted into the receiver 4, the data processing unit outputs a picture onto the screen 6, said picture showing a part of a schematic representation 10 of a mobile telephone, wherein the part of the schematic representation 20 of the mobile telephone in this state is located at an edge of the screen 6. If a position of the holder 19 and of the smartphone that is retracted further is detected by the position sensor, then the data processing unit outputs an accordingly more complete part of the schematic representation 20 of the mobile telephone as a picture onto the screen 6, the schematic representation 20 of the mobile telephone then also moving closer to a screen middle of the screen 6. The described positional detection and picture output is carried repeatedly whilst the holder 19 with the smartphone moves into the receiver 4. In this manner, an animation in which the schematic representation 20 of the mobile telephone moves from the edge to the middle of the screen is shown on the screen 6 during the retraction of the holder 19. Conversely, in the case of the extension of the holder 19, a corresponding animation is shown in which the schematic representation 20 of the mobile telephone moves from the middle of the picture in the direction of the edge.

Figure 10:
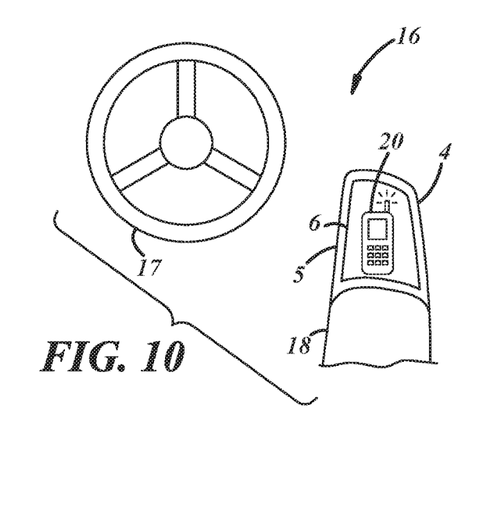

A state in which the holder 19 together with the smartphone is retracted completely into the receiver 4, so that the smartphone as well as the holder 19 can no longer be seen by the vehicle occupant, is shown in FIG. 10. The data processing unit is configured, in this state, to output a picture of the schematic representation 20 of the mobile telephone onto the screen 6 in the middle of the screen.

Features of the different embodiments which have been disclosed in the embodiment examples can be combined with one another and claimed individually.

The invention claimed is:

1. A docking station for a mobile electronic device for use in a vehicle interior, comprising a receiver for the mobile electronic device, a position sensor, a data processing unit, and a screen, wherein the receiver is configured for receiving the mobile electronic device, wherein the position sensor is configured to detect positions of the mobile electronic device relative to the receiver of the docking station, and wherein the data processing unit is connected to the position sensor and is configured to output pictures onto the screen in a manner dependent on the positions of the mobile electronic device relative to the receiver of the docking station to optically signal to a vehicle occupant how far the mobile electronic device is inserted into the receiver of the docking station, wherein the data processing unit is further configured to detect whether the mobile electronic device is partly inserted in the receiver of the docking station.

2. A docking station according to claim 1, further comprising a data transmission device which is connected to the data processing unit, wherein the data processing unit is configured to receive a screen content of the mobile electronic device in the form of data via the data transmission device, wherein the outputted pictures correspond to the screen content or to a part of the screen content.

3. A docking station according to claim 2, wherein the data transmission device is configured for the wireless receipt of the screen content of the mobile electronic device.

4. A docking station according to claim 2, further comprising a cover of the receiver which at least partly covers the mobile electronic device when the device is completely inserted into the receiver.

5. A docking station according to claim 4, wherein the outputted pictures each correspond to a part of the screen content which is covered by the cover.

6. A docking station according to claim 1, further comprising a guide element which is configured to guide the mobile electronic device into the receiver.

7. A docking station according to claim 6, wherein the guide element comprises two springs which are arranged on opposite inner sides of the receiver and are configured to guide the mobile electronic device into the receiver.

8. A docking station according to claim 6, wherein the guide element comprises a holder for the mobile electronic device, said holder being extendible and retractable relative to the receiver.

9. A docking station for a mobile electronic device for use in a vehicle interior, comprising a receiver for the mobile electronic device, a position sensor, a data processing unit, and a screen, wherein the receiver is configured for receiving the mobile electronic device, wherein the position sensor is configured to detect positions of the mobile electronic device relative to the receiver, and wherein the data processing unit is connected to the position sensor and is configured to output pictures onto the screen in a manner dependent on the positions of the mobile electronic device relative to the receiver to optically signal to a vehicle occupant how far the mobile electronic device is inserted into the receiver, wherein the position sensor comprises a sensor which is movable relative to the receiver and which is movable by way of a displacement of the mobile electronic device relative to the receiver, wherein the sensor is connected to a potentiometer in a manner such that an electrical resistance of the potentiometer is changeable by way of the displacement of the mobile electronic device relative to the receiver.

10. A docking station according to claim 1, wherein the position sensor comprises an optical sensor and/or a Hall effect sensor and/or a coder.

11. A docking station according to claim 1, wherein the screen comprises a touchscreen, wherein the docking station is configured to receive inputs for the mobile electronic device via the touchscreen and to transfer them to the mobile electronic device.

12. A docking station according to claim 1, wherein the position sensor comprises a microswitch which is configured to switch when the mobile electronic device is completely inserted into the receiver.

* * * * *